United States Patent
Nachlieli et al.

(10) Patent No.: US 10,534,800 B2
(45) Date of Patent: Jan. 14, 2020

(54) IDENTIFYING GROUPS

(71) Applicant: HEWLETT PACKARD ENTERPRISE DEVELOPMENT LP, Houston, TX (US)

(72) Inventors: Hila Nachlieli, Haifa (IL); George Forman, Port Orchard, WA (US); Renato Keshet, Haifa (IL)

(73) Assignee: MICRO FOCUS LLC, Santa Clara, CA (US)

( * ) Notice: Subject to any disclaimer, the term of this patent is extended or adjusted under 35 U.S.C. 154(b) by 162 days.

(21) Appl. No.: 15/564,573

(22) PCT Filed: Apr. 30, 2015

(86) PCT No.: PCT/US2015/028668
§ 371 (c)(1),
(2) Date: Oct. 5, 2017

(87) PCT Pub. No.: WO2016/175866
PCT Pub. Date: Nov. 3, 2016

(65) Prior Publication Data
US 2018/0081961 A1 Mar. 22, 2018

(51) Int. Cl.
*G06F 17/30* (2006.01)
*G06F 16/28* (2019.01)
(Continued)

(52) U.S. Cl.
CPC .......... *G06F 16/285* (2019.01); *G06F 5/01* (2013.01); *G06N 5/04* (2013.01); *G06N 99/00* (2013.01)

(58) Field of Classification Search
None
See application file for complete search history.

(56) References Cited

U.S. PATENT DOCUMENTS

| | | | | |
|---|---|---|---|---|
| 5,497,489 A | * | 3/1996 | Menne | G06F 16/322 707/696 |
| 5,966,704 A | | 10/1999 | Furegati et al. | |

(Continued)

FOREIGN PATENT DOCUMENTS

WO WO-2013012990 1/2013

OTHER PUBLICATIONS

Eamonn Keogh, Stefano Lonardi and Bill 'YuanLchi' Chiu; "Finding Surprising Patterns in a Time Series Database in Linear Time and Space"; http://www.cs.ucr.edu/~eamonn/sigkdd_.

(Continued)

*Primary Examiner* — Hung D Le

(57) ABSTRACT

An example method is provided in accordance with one implementation of the present disclosure. The method comprises generating a group of most frequent elements in a dataset, calculating features of each of the most frequent elements in the dataset, applying a trained model to the features of each of the most frequent elements, and generating a list of predicted relevant elements from the list of most frequent elements. The method further comprises determining at least one element-chain group for each predicted relevant element and a group score for the element-chain-group, ordering a plurality of element-chain groups for the dataset based on the group score for each of the element-chain groups, and identifying a predetermined number of element-chain groups to be outputted to a user.

20 Claims, 6 Drawing Sheets

(51) Int. Cl.
*G06F 5/01* (2006.01)
*G06N 5/04* (2006.01)
*G06N 99/00* (2019.01)

(56) References Cited

U.S. PATENT DOCUMENTS

| | | | |
|---|---|---|---|
| 6,006,223 A | 12/1999 | Agrawal et al. | |
| 6,567,936 B1* | 5/2003 | Yang | G06F 16/284 |
| | | | 714/37 |
| 7,376,618 B1* | 5/2008 | Anderson | G06Q 20/10 |
| | | | 705/38 |
| 7,565,304 B2 | 7/2009 | Casati | G06Q 10/06312 |
| | | | 705/7.27 |
| 7,644,006 B2* | 1/2010 | Casati | G06Q 10/063 |
| | | | 705/7.38 |
| 7,899,776 B2* | 3/2011 | Crivat | G06F 16/283 |
| | | | 706/60 |
| 8,543,576 B1 | 9/2013 | Buryak et al. | |
| 8,836,994 B2* | 9/2014 | Yanai | G06K 15/107 |
| | | | 347/15 |
| 9,069,842 B2* | 6/2015 | Melby | G06F 16/3322 |
| 9,153,489 B2* | 10/2015 | Lee | H01L 23/481 |
| 10,074,079 B2* | 9/2018 | Kapoustin | G06F 16/2448 |
| 2011/0246574 A1* | 10/2011 | Lento | G06Q 10/10 |
| | | | 709/204 |
| 2012/0096013 A1* | 4/2012 | Ciancutti | G06F 16/907 |
| | | | 707/749 |
| 2012/0299095 A1* | 11/2012 | Hashimoto | H01L 29/41758 |
| | | | 257/342 |
| 2014/0172857 A1* | 6/2014 | Powell | G06F 16/337 |
| | | | 707/738 |
| 2015/0044659 A1* | 2/2015 | Basu | G09B 7/04 |
| | | | 434/350 |
| 2015/0356087 A1* | 12/2015 | Alvino | G06Q 30/02 |
| | | | 707/728 |
| 2016/0232575 A1* | 8/2016 | Kirti | G06Q 30/0269 |
| 2017/0053024 A1 | 2/2017 | Forman | |

OTHER PUBLICATIONS

Geng Li et al., "Stochastic Subspace Search for Top-K Multi-View Clustering," Proceedings of the 4th MultiClust Workshop on Multiple Clusterings Multi view Date and Multi source Knowledge driven Clustering.

Mark Hornick ; "Low-rank Matrix Factorization in Oracle R Advanced Analytics for Hadoop" https://blogs.oracle.com/R/entry/low_rank_matrix_factorization_in.

Muller, Emmanuel, et al., "Discovering Multiple Clustering Solutions: Grouping Objects in Different Views of the Data," IEEE 28th International Conference on Data Engineering (ICDE 2012) pp. 1207-1210 Apr. 1-5, 2012.

International Searching Authority., International Search Report and Written Opinion dated Jan. 27, 2016 for PCT Application No. PCT/US2015/028668 Filed Apr. 30, 2015, 12 pgs.

Rubin et al., Statistical topic models for multi-label document classification, 2011 (44 pages).

\* cited by examiner

IDENTIFYING GROUPS

BACKGROUND

Clustering is typically the task of grouping a set of objects or elements in such a way that objects in the same group (e.g., cluster) are more similar to each other than to those in other groups (e.g., clusters). In a typical scenario, a user provides a clustering application with a plurality of objects that are to be clustered. The clustering application typically generates clusters from the plurality of objects in an unsupervised manner, where the clusters may be of interest to the user.

DETAILED DESCRIPTION OF SPECIFIC EXAMPLES

Figure 1:
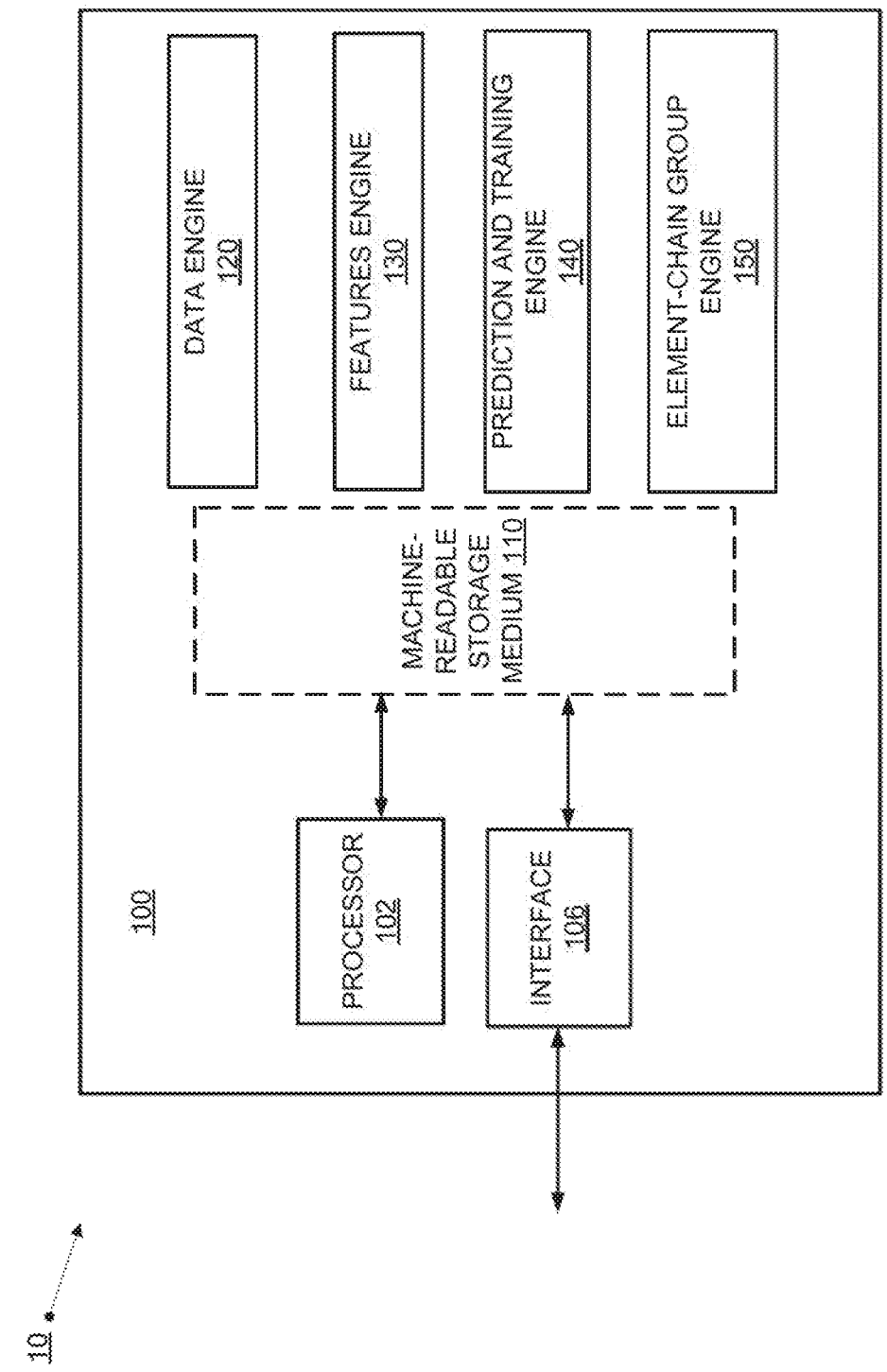
FIG. 1 is a schematic illustration of an example system for identifying a set of groups in a dataset in accordance with an implementation of the present disclosure.

Finding a subset of elements (e.g., words, phrases, terms, objects, numbers, key-value pairs, etc.) in a dataset may be challenging, especially when it must be completed prior to user interaction with a new (e.g., unstructured) dataset of elements (i.e., without any user feedback related to the elements of dataset). Today, there are clustering algorithms or applications that partition different datasets and generate corresponding clusters in various ways. These clustering algorithms usually offer a single breakdown of the dataset. For example, when a dataset includes different cars, clusters of red, green, and blue cars may be generated from that dataset, ignoring other potential ways to divide the available data. However, the resulting clusters may not be useful to a user.

In another example, a user may load a dataset of sports news. One user may be interested to cluster the data based on the different sports (basketball, cricket etc.), another user may be interested to cluster the data according to the relevant country, and yet another user may be interested to cluster the data based on the significance of the game. Traditional or automatic clustering may or may not return one of those views (e.g., data based on the country), which may not be the view that the user is interested in.

In this regard, according to examples, data factorization techniques that find sets of elements that represent possibly interesting subsets in a new dataset are described herein. These data factorization techniques do not partition all the data in a dataset, but offer a variety of different ways to subdivide the data. For instance, the proposed data factorization techniques may automatically generate a set of attribute sets (e.g. the attribute sets for cars can include red/green/blue, SUV/sedan, Toyota/Chevrolet/BMW, etc.) without any initial input by the user. Thus, the proposed data factorization techniques may provide the user with several initial clusters for several different views of how to break down the data.

In one example, a processor generates a group of most frequent elements in a dataset, calculates features of each of the most frequent elements in the dataset, and apples a trained model to the features of each of the most frequent elements. The processor may further generate a first of predicted relevant elements from the list of most frequent elements, determine at least one element-chain group for each predicted relevant element and a group score for the element-chain-group, and order a plurality of element-chain groups for the dataset based on the group score for each of the element-chain groups. Finally, the processor may identify a predetermined number of element-chain groups to be output to a user.

Thus, without any in initial input from a user, the described data factorization technology returns several proposed groups of elements (e.g., words), where each group represents a different view of the data in a new dataset. Based on the return of the several groups of similar elements, a user can select one group in order to define a cluster.

In the following detailed description, reference is made to the accompanying drawings, which form a part hereof, and in which is shown by way of illustration specific examples in which the disclosed subject matter may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. Also, it is to be understood that the phraseology and terminology used herein is for the purpose of description ad should not be regarded as limiting. The use of "including," "comprising" or "having" and variations thereof herein is meant to encompass the items listed thereafter and equivalents thereof as well as additional items. Furthermore, the term "based on," as used herein, means "based at least in part on." It should also be noted that a plurality of hardware and software based devices, as well as a plurality of different structural components may be used to implement the disclosed methods and devices.

Referring now to the figures, FIG. 1 is a schematic illustration of an example system 10 for identifying a set of groups in a dataset. The illustrated system 10 is capable of carrying out the techniques described below. As shown in FIG. 1, the system 10 is depicted as including at least one a computing device 100. In the embodiment of FIG. 1, computing device 100 includes a processor 102, an interface 106, and a machine-readable storage medium 110. Although only computing device 100 is described in details below, the techniques described herein may be performed with several computing devices or by engines distributed on different devices.

The computing device 100 may be any type of a computing device and may include at least engines 120-150. Engines 120-150 may or may not be part of the machine-readable storage medium 110. In one example, the computing device 100 may be an independent computing device. In another alternative example, engines 120-150 may be distributed between the computing device 100 and others computing devices. The computing device 100 may include additional components and some of the components depicted therein may be removed and/or modified without departing from a scope of the system that allows for carrying out the functionality described herein. It is to be understood that the operations described as being performed by the engines 120-150 of the computing device 100 that are related to this description may, in some implementations, be performed by external engines (not shown) or distributed between the engines of the computing device 100 and other electronic/computing devices.

Processor 102 may be central processing unit(s) (CPUs), microprocessor(s), and/or other hardware device(s) suitable for retrieval and execution of instructions (not shown) stored in machine-readable storage medium 110. Processor 102 may fetch, decode, and execute instructions to for identify different groups in a dataset. As an alternative or in addition to retrieving and executing instructions, processor 102 may include electronic circuits comprising a number of electronic components for performing the functionality of instructions.

Interface 106 may include a number of electronic components for communicating with various devices. For example, interface 106 may be an Ethernet interface, a Universal Serial Bus (USB) interface, an IEEE 1394 (Firewire) Interface, an external Serial Advanced Technology Attachment (eSATA) interface, or any other physical connection interface suitable for communication with the server device. Alternatively, interface 108 may be a wireless interface, such as a wireless local area network (WLAN) interface or a near-field communication (NFC) interface that is used to connect with other devices/systems and/or to a network, in one example, the network may be a mash sensor network (not shown). The network may include any suitable type or configuration of network to allow for communication between the computing device 100, and any other devices/systems (e.g., other computing devices, displays, etc.), for example, to send and receive data to and from a corresponding interface of another device.

Each of the engines 120-150 may include, for example, at least one hardware device including electronic circuitry for implementing the functionality described below, such as control logic and/or memory. In addition or as an alternative, the engines 120-150 may be implemented as any combination of hardware and software to implement the functionalities of the engines. For example, the hardware may be a processor and the software may be a series of instructions or microcode encoded on a machine-readable storage medium and executable by the processor. Therefore, as used herein, an engine may include program code, e.g., computer executable instructions, hardware, firmware, and/or logic, or combination thereof to perform particular actions, tasks, and functions described in more detail herein in reference to FIGS. 2-8.

In one example, the data engine 120 may generate a list of the most frequent elements in a dataset (e.g., "most frequent (MF) group or list". In one implementation, this dataset may be a new dataset (e.g., an unstructured dataset). In another implementation, the examined dataset may include a combination of structured and unstructured data or only structured data.

The features engine 130 may calculate features of each of the most frequent elements in the dataset. In one example, the definition of feature may be the same for all elements in the dataset but each element may have a different feature value. In one implementation, the features engine 130 may calculate a feature value of each of the most frequent elements by calculating a ratio for each pair in the MF list of elements (i.e., each most frequent element is paired with all other elements in the MF list). The process of calculating a feature value-ratio will be described in additional details below. In another implementation, the features engine 130 may use a different technique to calculate the features of each of the most frequent elements in the dataset.

The prediction and training engine 140 may apply a trained model to the features of each of the most frequent elements and may generate a list of predicted relevant elements from the list of most frequent elements. As used herein, the term "predicted relevant elements" refers to elements that may be potentially grouped in sets and presented to a user. In other words, the prediction and training engine 140 may use a previously generated trained model to interact with the features of the most frequent elements and to perform an automatic prioritization, suggestion, and generation of predicted relevant elements. In some examples, the training model can be any learning method (e.g., gradient boosting classifier teaming model, etc.). In addition, the prediction and training engine 140 may generate the training model used to determine the first of predicted relevant elements from the list of most frequent elements.

The element-chain group engine 150 may determine at least one element-chain group for each predicted relevant element and a group score for the element-chain-group. As used herein, the term "element-chain group" refers to a group of predicted relevant elements that may represent a possibly interesting subset of the dataset. In one example, an element-chain group may include a plurality of predicted relevant elements that are relevant to each other (e.g., the words red, green, blue, and yellow; or the words hot, warm, and cold). In some examples, the element-chain group engine 150 may determine a plurality of element-chain groups.

In addition, the element-chain group engine 160 may order a plurality of element-chain groups for the dataset based on the group score for each of the element-chain groups, and may identify a predetermined number of element-chain groups to be outputted to a user. In other words, the element-chain group engine 180 may calculate a score for each of the element-chain groups, rank the groups based on that score, and may present (e.g., display, send, etc.) a number of top-scoring element-chain groups from the dataset to a user (e.g., wild sees the dataset for the first time or has had little interaction with the dataset).

Figure 2:
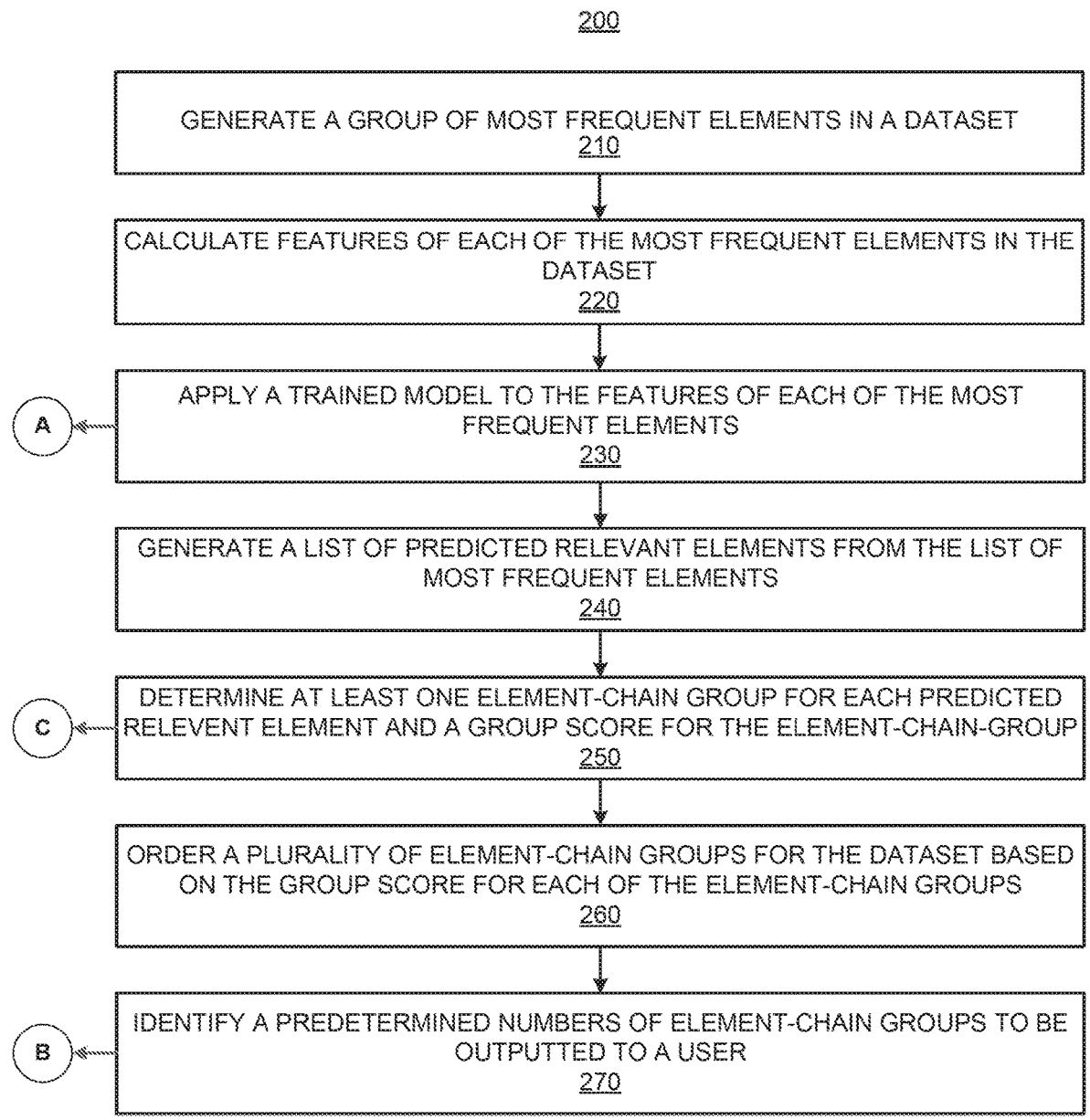
FIG. 2 illustrates a flowchart showing an example of a method for identifying a set of groups in a dataset in accordance with an implementation of the present disclosure.

FIG. 2 illustrates a flowchart showing an example of a method 200 for identifying a set of groups in a dataset. Although execution of the method 200 is described below with reference to the system 10, the components for executing the method 200 may be spread among multiple devices/systems. The method 200 may be implemented m the form of executable instructions stored on a machine-readable storage medium, and/or in the form of electronic circuitry.

In one example, the method 200 can be executed by at least one processor of a computing device (e.g., processor 102 of device 100). In other examples, the method may be executed by another processor in communication with the system 10. Various elements or blocks described herein with respect to the method 200 are capable of being executed simultaneously, in parallel, or in an order that differs from the illustrated serial manner of execution. The method 200 is also capable of being executed using additional or fewer elements than are shown in the illustrated examples.

The method 200 begins at 210, where a processor may generate a group of most frequent elements in a dataset. In one implementation, the processor may identify a predetermined number (e.g., 50, 200, 300, 1000, etc.) of the most frequent elements (e.g., words) in a new dataset (e.g., an unstructured dataset). Each dataset may include a large number of items (e.g., articles, vehicles, etc.)

At 220, the processor may calculate features of each of the most frequent elements in the dataset. As mentioned above, the processor may calculate a feature value of each of the most frequent elements in the MF list by calculating a ratio for each pair in the MF list of elements (i.e., each most frequent element is paired with all other elements in the MF list). Equation 1 represents m example technique for calculating a pair ratio for each of the most frequent elements in the MF list.

$$\text{Pair\_ratio}=((\varepsilon+X)/(\varepsilon+Y)) \qquad (1)$$

In Equation 1, X represent the number of cases (e.g., items like articles, etc.) in the dataset that contain at least one of the two elements, Y represents the number of cases in the dataset that contain both elements, and $\varepsilon$ (epsilon) is a small number (e.g., 0.001, etc.) to avoid dividing by zero. In one example, the occurrence of the pair is analyzed for every case/item (e.g., news article) in the initial large dataset.

In one example, for each of most frequent elements in the MF list, the processor may select a number (e.g., 10) of the biggest Pair_ratio values to represent this element (e.g., the highest 10 matches for the elements). Thus, the features of this element may be: feature one may be the biggest score of pairs that contain this elements, feature two may be the second biggest score, etc.

Next, the processor may apply a trained model to the features of each of the most frequent elements (at 230). Thus, the processor may use a previously generated trained model to interact with the features of the most frequent elements in the new dataset and to perform an automatic generation (i.e., suggestion) of predicted relevant elements, in one example, the processor may normalize the features of each of the most frequent elements in the dataset with normalization factors generated for a training dataset.

Figure 3:
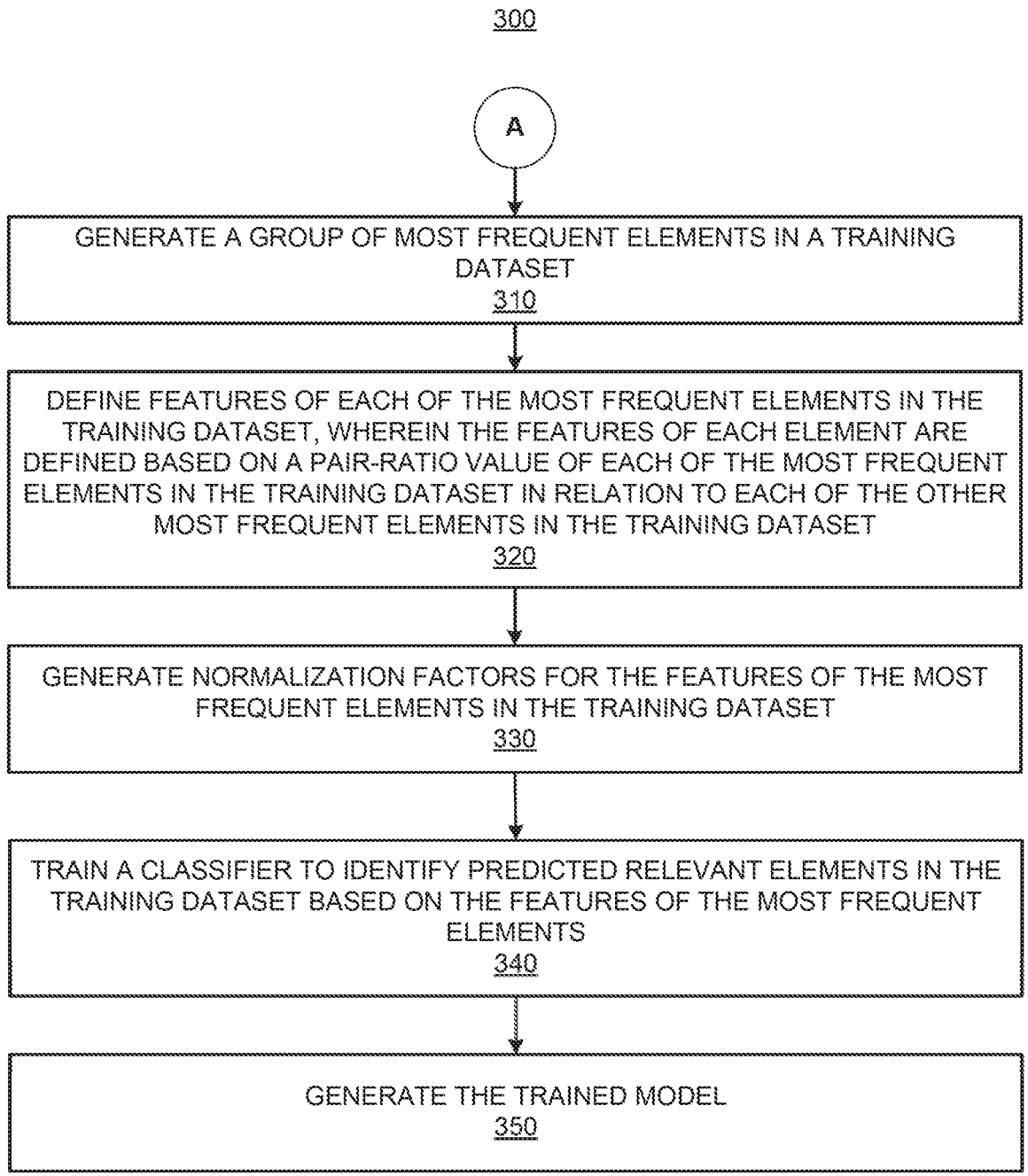
FIG. 3 is illustrates a flowchart showing an example of a method for generating a trained model in accordance with an implementation of the present disclosure.

A method 300 for generating a trained model is described in more details in relation to FIG. 3. The method 300 can be executed by at least one processor of a computing device (e.g., processor 102 of device 100). In other examples, the method may be executed by another processor in communication with the system 10. The trained model may be generated by using a training dataset.

The method 300 begins at 310, where the processor may generate a group of most frequent elements in the training dataset. At 320, the processor may define features of each of the most frequent elements in the training dataset. The process of defining features for the elements in the training dataset may be similar to the process described in block 220 of the method 200. Thus, in one example, the features of each element in the training dataset may be defined based on a pair-ratio value of each of the most frequent elements in the training dataset in relation to each of the other most frequent elements in the training dataset.

At 330, the processor may generate normalization factors for the features of the most frequent elements in the training dataset. In some examples, the normalization factors may transform each of the features to be between the values of 0 and 1. The normalization factors may be used for normalizing the features of each of the most frequent elements in the new dataset (i.e., method 200).

Next, the processor may train a classifier to identify predicted relevant elements in the training dataset based on the features of the most frequent elements (at 340). In one implementation, the classifier may be a gradient boosting classifier learning model. Then, at 350, the processor may generate the trained model. In other words, the classifier may be trained to look at features of elements of a new dataset and automatically decide which are "predicted relevant elements" in that dataset based on parameters for these features, where the parameters are carried along in the training model and are applied to the new dataset.

With continued reference to FIG. 2, the processor may generate a list of predicted relevant elements from the list of most frequent elements (at 240). The size of the list of predicted relevant elements may be different and may depend on the size of the dataset, on the size of the MF list, etc. As noted above, the predicted relevant elements of a dataset refer to elements that may be grouped in different sets and may be outputted to a user. In some examples, the probability that an element in the dataset is determined to be a predicted relevant element may be calculated based on a predetermined threshold. For instance, a probability score may be calculated for each of the elements in the list of MF elements. In some examples, the probability score may represent the likelihood that an element is a relevant element. The processor may then compare the probability score for each of the elements in the MF list with the predetermined threshold to generate the list of predicted relevant elements from the list of MF elements. In some examples, if the number of predicted relevant elements is too small (e.g., very few elements are above the predetermined threshold), the processor may add elements that where not predicted to be predicted relevant elements to the list of predicted relevant elements. For instance, the processor may take the elements with highest probability to predicted relevant elements from the elements that are not predicted to be such (i.e., the elements that were ranked below the threshold) and add them to the list of predicted relevant elements.

At 250, the processor may determine at least one element-chain group for each predicted relevant element and a group score for the element-chain-group. In one example, an element-chain group may include a plurality of predicted relevant elements that are relevant to each other (e.g., complete each other). Thus, each of the identified predicted relevant elements may be placed in a group of predicted relevant elements that may represent a possibly interesting subset of the dataset (e.g., for cars the groups may include color, size, make, model, etc.). The different techniques for determining at least one element-chain group for each predicted relevant element are explained in more details in relation to FIG. 4 below.

At 260, the processor may order a plurality of element-chain groups for the dataset based on the group score for each of the element-chain groups. Thus, when the processor identifies a plurality of element-chain groups for the dataset, the processor may rank these groups by using the group score of each group. In one example, the group score of an element-chain group may be computed based on a sum of all pair-wise scores of all pairs of elements in an element-chain group. In one implementation, a pair-wise score may be a function that analyzes the data in the dataset in relation to pairs of elements in the different element-chain groups. For each pair of elements (e.g., a first element A and a second element B) in an element-chain group, the pair-wise score function may return an estimated value regarding the occurrence of the pair of elements in the data of the dataset.

In some examples, the following techniques may be used to determine a pair-wise score for a pair of elements in every case/items (e.g., news article) in the dataset: a) find the number of cases/items in the set of cases/items that contain the second element (e.g., B) of the elements (e.g., A and B) in the pair of elements and not both; b) find the number of cases/items in the set of cases/items that contain at least one of the elements (e.g., A and B) of the pair of elements but may contain both; c) find the number of cases/items that contain both elements (e.g., A and B) from the pair of elements; d) find mutual information (e.g., Kullback_Leibler distance) between the set of cases/items that contain one element of the pair to the set of cases/items that contain the other element in the pair; e) calculate the Pair_ratio (e.g., equation 1) for those two elements (e.g., A and B). After that, the processor may compute the sum of all pair-wise scores of all pairs of elements in an element-chain group to determine the group score of an element-chain group, in other implementations, different techniques may be used to calculate the group score of an element-chain group.

At 270 the processor may identify a predetermined number of element-chain groups to be outputted to a user. In one implementation, after ranking the element-chain groups based on that group score, the processor may output (e.g., send, etc.) a predefined number (3, 5, 10, etc.) of element-chain groups from the dataset to a user. That way, a user who sees the dataset for the first time or has had little interaction with the dataset may be presented with potentially interesting subsets or clusters of elements. One or more of the presented subsets may be of interest to the user and he or she may further define the generated subset of elements based on interest.

Figure 4:
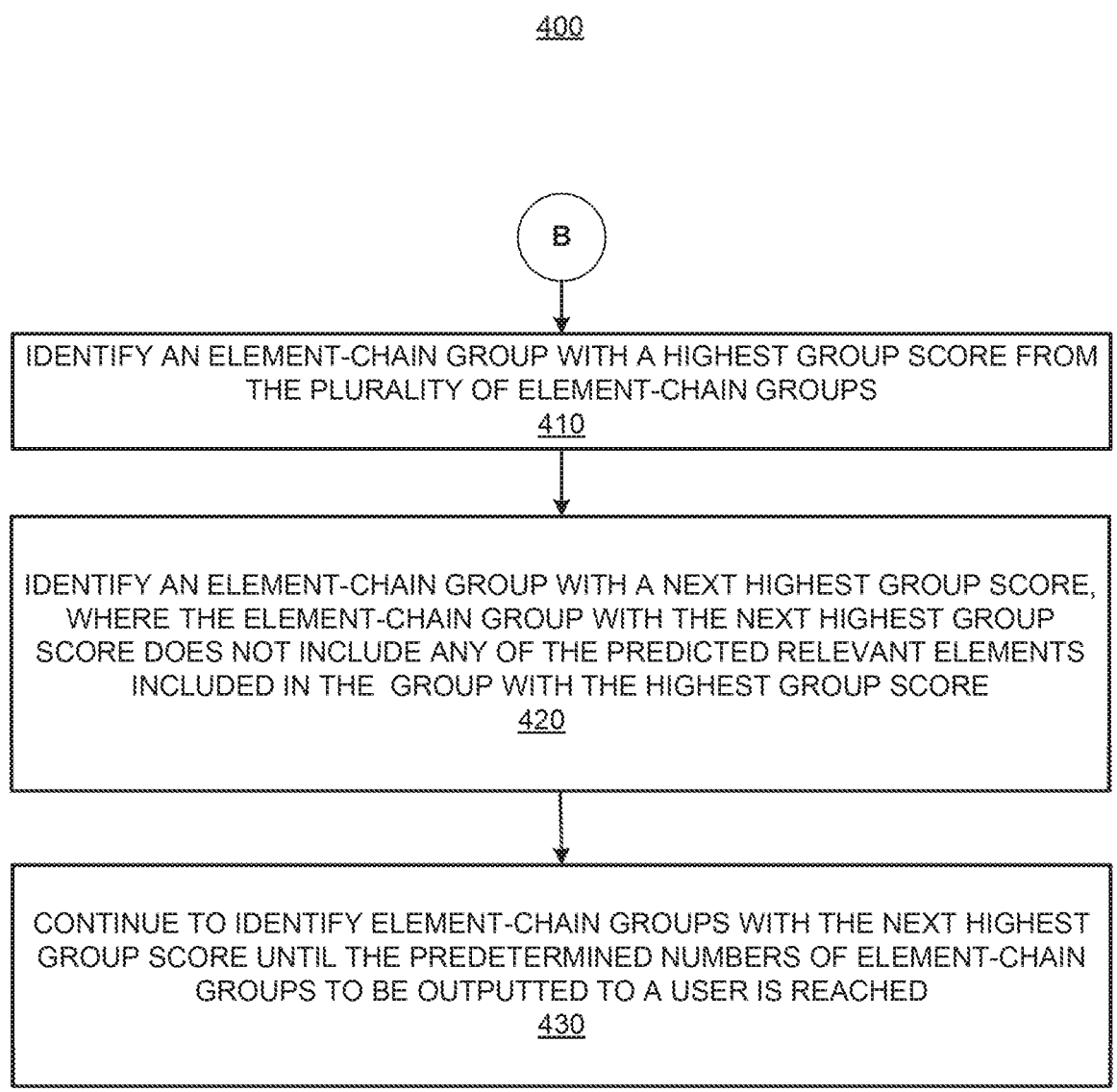
FIG. 4 illustrates a flowchart showing an example of a method for ordering and selecting element-chain groups to be outputted to a user in accordance with an implementation of the present disclosure.

FIG. 4 illustrates a flowchart showing an example of a method 400 for ordering and selecting element-chain groups to be outputted to a user. The method 400 can be executed by at least one processor of a computing device (e.g., processor 102 of device 100). In other examples, the method may be executed by another processor in communication with the system 10.

The method 400 begins at 410 where the processor identifies an element-chain group with the highest group score from the plurality of element-chain groups. As mentioned above, the processor may use different techniques to calculate the group scores for the plurality of element-chain groups.

At 420, the processor may identify an element-chain group with a next highest group score, where the element-chain group with the next highest group score does not include any of the predicted relevant elements included in the group with the highest group score. Thus, the processor determines a potentially different element-chain group with elements in order to present different subset of elements to the user.

At 430, the processor continues to identify element-chain groups with the next highest group score until the predetermined number of element-chain groups to be outputted to a user is reached, in one example, these added element-chain groups with the next highest group score do not include any of the predicted relevant elements included in the previously added groups, in other words, when the newly identified element-chain groups with the next highest group score include predicted relevant elements that are already included in the previously added groups, these new groups may not be added to the number of element-chain groups to be outputted to the user even if they have the next highest group score. In that case, the element-chain groups with the following highest group score may be added instead. In one implementation, the processor may identify three groups that are to be presented to a user, in another implementation, a different number of groups may be identified. In an example where the dataset includes news articles, the outputted different element-chain groups may include the following groups (in addition to others), a) UK, Switzerland, USA, Portugal, Zealand; b) tennis, soccer, skiing, NHL, NBA; c) into, results, summaries, scoreboard, for. In this example, element-chain group (a) presents a perspective of different countries, group (b) presents a perspective of different sports, and group (c) presents a perspective of different types of stories.

Figure 5:
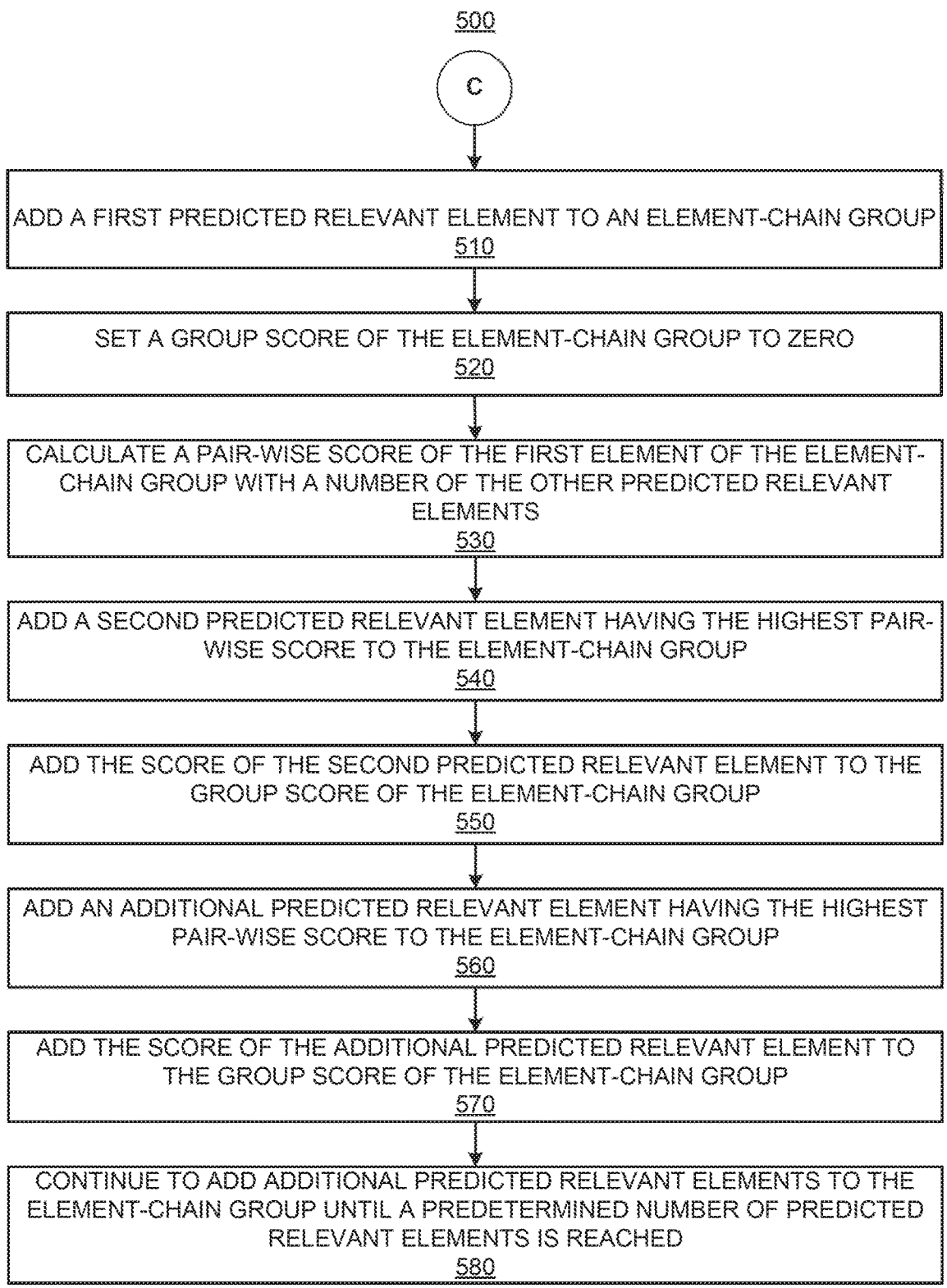
FIG. 5 illustrates a flowchart showing an example of a method for determining an element-chain group for each predicted relevant element and a group score for the element-chain-group in accordance with an implementation of the present disclosure.
Figure 6:
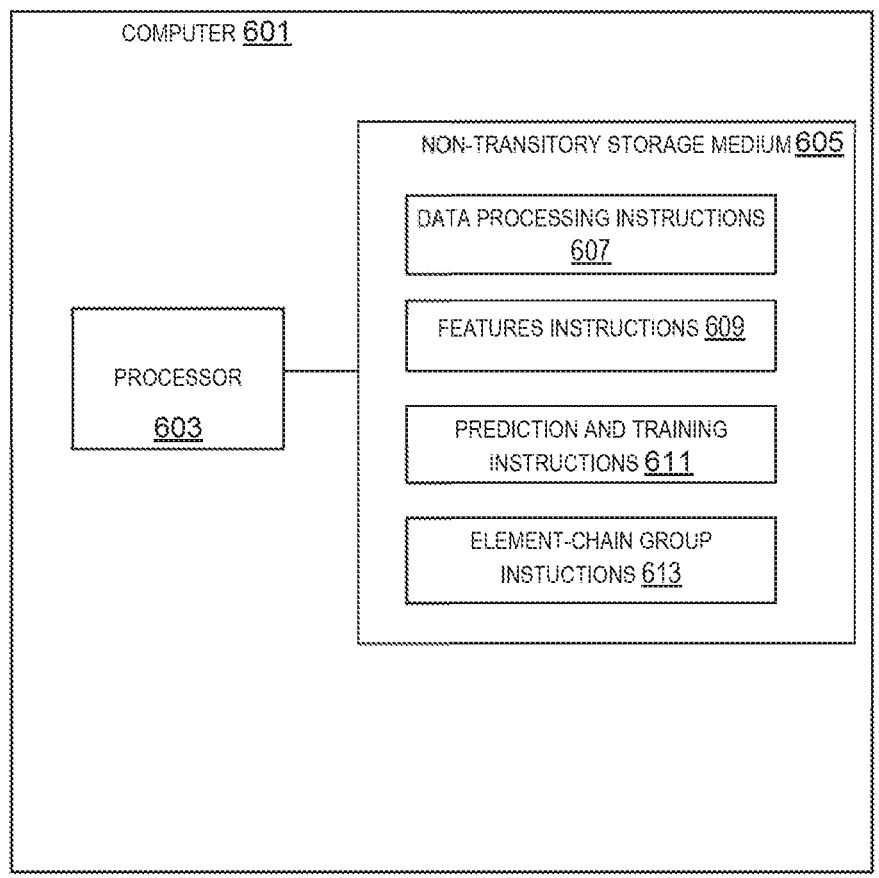
FIG. 6 is an example block diagram illustrating a computer-readable medium in accordance with an Implementation of the present disclosure.

FIG. 5 illustrates a flowchart showing an example of a method 500 for determining an element-chain group for each predicted relevant element and a group score for the element-chain-group. The method 500 can be executed by at least one processor of a computing device (e.g., processor 102 of device 100). In other examples, the method may be executed by another processor in communication with the system 10.

The method 500 begins at 510 where a processor may add a first predicted relevant element to an element-chain group. As noted above, the probability that an element in the dataset is a predicted relevant element may be calculated based on a predetermined threshold and/or a pre-trained model (e.g. gradient boosting classifier model, etc.). In one example, a probability score may be calculated for each of the elements in the MF list of elements. Then, the processor may compare the probability score for each of the elements in the MF list with the predetermined threshold to generate the list of predicted relevant elements from the list of MF elements. In other words, after the processor creates an initial list of predicted relevant elements, the processor may determine at least one element-chain group for each predicted relevant element. Thus, in one example, all predicted relevant elements may be identified as "seeds" of an element-chain group. The processor may also calculate the pair-wise score between all of the pairs of elements in the predicted relevant elements list (e.g., as described above in relation to block 260 of the method 200).

At 520, the processor may set a group score of the element-chain group to zero. That is the initial step of calculating the group score of the element-chain group. Next, the processor may calculate a pair-wise score of the first element of the element-chain group with a number of the other predicted relevant elements (at 530). In one implementation, the processor may calculate a pair-wise score of the first element with each of the other predicted relevant elements, in other implementations, the processor may calculate a pair-wise score of the first, element with a selected number of the other predicted relevant elements (e.g., the elements that have the highest probability score). Thus, in one example, the first predicted relevant element in the element-chairs group may be paired with each of the other predicted relevant elements. Then, the processor determines the pair-wises score of the identified pairs that include the first predicted relevant element and one of the other paired predicted relevant elements, in one example, the processor may select the pair with the maximum pair-wise score.

At 540, the processor may add a second predicted relevant element having the highest pair-wise score to the element-chain group. Thus, the processor may supplement the group by adding the next most relevant predicted relevant element to that group. The processor may then add the score of the second predicted relevant element to the group score of the element-chain group (at 550). That way, the group score of the element-chain group may be supplemented with the addition of new predicted relevant elements.

At 560, the processor may add an additional predicted relevant element having the highest pair-wise score to the element-chain group. In one example, the processor may compute a pair-wise score between the group of existing elements (2, 3, 5, etc.) in the element-chain group and each of the remaining predicted relevant elements. For instance, the processor may identify all items/cases (e.g., news articles) that do not contain any of the existing elements in the element-chain group. Then, the processor may determine which of the remaining predicted relevant elements has the highest pair-wise score in relation to the group of existing elements in the element-chain group. Once that element is identified, the processor may add it to the element-chain group. Thus, the processor may continue to supplement the element-chain group with additional predicted relevant elements that are related to each other and complete the proposed group of elements.

Next, the processor may add the score of the additional predicted relevant element to the group score of the element-chain group (at 570). Thus, the processor may continue to supplement the score of the element-chain group based on the added predicted relevant elements. At 530, the processor may continue to add additional predicted relevant elements to the element-chain group until a predetermined number of predicted relevant elements is reached. The number of predicted relevant elements in an element-chain group may be different.

Alternatively, a different technique for determining an element-chain group for each predicted relevant element and a group score for the element-chain-group may be used. For example, the processor may define a pre-determined number (e.g., N) of elements to be output or displayed to the user. Then, all combinations of N elements from the predicted relevant element list may be identified to compute a group score for the element-chain-group. For each combination of N elements, the group score may be the sum of all pair-wise scores of the elements in the group. In other examples, different techniques for determining the group score may be used.

FIG. 8 illustrates a computer 601 and a non-transitory machine-readable medium 805 according to an example. In one example, the computer 801 maybe similar to the computing device 100 of the system 10 or may include a plurality of computers. For example, the computer may be a server computes, a workstation computer, a desktop computer, a laptop, a mobile device, or the like, and may be part of a distributed system. The computer may include one or more processors and one or more machine-readable storage media. In one example, the computer may include a user interface (e.g., touch interface, mouse, keyboard, gesture input device, etc.).

Computer 601 may perform methods 200-500 and variations thereof. Additionally, the functionality implemented by computer 601 may be part of a larger software platform, system, application, or the like. Computer 601 may be connected to a database (not shown) via a network. The network may be any type of communications network, including, but not limited to, wire-based networks (e.g., cable), wireless networks (e.g., cellular, satellite), cellular telecommunications networks), and IP-based telecommunications network(s) (e.g., Voice over Internet Protocol networks). The network may also include traditional landline or a public switched telephone network (PSTN), or combinations of the foregoing.

The computer 601 may include a processor 603 and non-transitory machine-readable storage medium 605. The processor 603 (e.g., a central processing unit, a group of distributed processors, a microprocessor, a microcontroller, an application-specific integrated circuit (ASIC), a graphics processor, a multiprocessor, a virtual processor, a cloud processing system, or another suitable controller or programmable device) and the storage medium 305 may be operatively coupled to a bus. Processor 803 can include single or multiple cores on a chip, multiple cores across multiple chips, multiple cores across multiple devices, or combinations thereof.

The storage medium 605 may include any suitable type, number, and configuration of volatile or non-transitory machine-readable storage media to store instructions and data. Examples of machine-readable storage media in include read-only memory ("ROM"), random access memory ("RAM") (e.g., dynamic RAM ["DRAM"], synchronous DRAM ["SDRAM"], etc.), electrically erasable programmable read-only memory ("EEPROM"), magnetoresistive random access memory (MRAM), memristor, flash memory, SD card, floppy disk, compact disc read only memory (CD-ROM), digital video disc read only memory (DVD-ROM), and other suitable magnetic, optical, physical, or electronic memory on which software may be stored.

Software stored on the non-transitory machine-readable storage media 805 and executed by the processor 603 includes, for example, firmware, applications, program data, filters, rules, program modules, and other executable instructions. The processor 603 retrieves from the machine-readable storage media 605 and executes, among other things, instructions related to the control processes and methods described herein.

The processor 603 may fetch, decode, and execute instructions 307-311 among others, to implement various processing. As an alternative or in addition to retrieving and executing instructions, processor 803 may include at least one integrated circuit (IC), other control logic, other electronic circuits, or combinations thereof that include a number of electronic components for performing the functionality of instructions 807-613. Accordingly, processor 803 may be implemented across multiple processing units and instructions 607-613 may be implemented by different processing units in different areas of computer 801.

The instructions 807-813 when executed by processor 603 (e.g., via one processing element or multiple processing elements of the processor) can cause processor 603 to perform processes, for example, methods 200-500, and/or variations and portions thereof. In other examples, the execution of these and other methods may be distributed between the processor 603 and other processors in communication with the processors 603.

For example, data processing instructions 607 may cause processor 603 to generate a group of most frequent elements in a dataset (e.g., a new/unconstructed dataset). These instructions may function similarly to the techniques described in block 210 of method 200.

Features instructions 609 may cause the processor 603 to calculate features of each of the most frequent elements in the dataset. These instructions may function similarly to the techniques described in block 220 of method 200. For example, the features instructions 609 may cause the processor 603 to calculate a feature value of each of the most frequent elements and the MF list by calculating a ratio for each pair in the MF list of elements (e.g., where each most frequent element is paired with all other elements in the MF list).

Prediction and training instructions 611 may cause the processor 603 to apply a trained model to the features of each of the most frequent elements and to generate a list of predicted relevant elements from the list of most frequent elements. These instructions may function similarly to the techniques described blocks 230-240 of method 200. Further, the prediction and training instructions 611 may cause the processor 603 to generate the training model used to determine the list of predicted relevant elements from the list of most frequent elements, in some examples, these instructions may function similarly to the techniques described in method 300. In addition, the prediction and training instructions 611 may cause the processor 603 to normalize the features of each of the most frequent elements in the dataset with normalization factors generated for a training dataset.

Element chain-group instructions 613 may cause the processor 603 to determine at least one element-chain group for each predicted relevant element and a group score for the element-chain-group, where an element-chain group includes a plurality of predicted relevant elements that are relevant to each other. Further, the element chain-group instructions 613 may cause the processor 603 to order a plurality of element-chain groups for the dataset based on the group score for each of the element-chain groups, and to identify a predetermined number of element-chain groups to be outputted to a user. These instructions may function similarly to the techniques described blocks 250-240 of method 270.

In the foregoing description, numerous details are set forth to provide an understanding of the subject matter disclosed herein. However, implementations may be practiced without some or all of these details. Other implementations may include modifications and variations from the details discussed above. It is intended that the appended claims cover such modifications and variations.

What is claimed is:

1. A method performed by a system comprising a hardware processor, comprising:
    identifying most frequent elements in a dataset;
    calculating features of each of the most frequent elements in the dataset;
    applying a trained model to the features of each of the most frequent elements;
    generating a group of predicted relevant elements from the most frequent elements;
    determining a plurality of element-chain groups and calculating group scores for the plurality of element-chain groups, wherein each element-chain group of the plurality of element-chain groups comprises a respective subset of the predicted relevant elements in the group of predicted relevant elements;
    ordering the plurality of element-chain groups for the dataset based on the group scores for the plurality of element-chain groups; and
    identifying a predetermined number of element-chain groups of the plurality of element-chain groups to be outputted to a user.

2. The method of claim 1, further comprising:
    identifying most frequent elements in a training dataset;
    defining features of each of the most frequent elements in the training dataset, wherein the features of each of the most frequent elements in the training dataset are defined based on a pair-ratio value of each of the most frequent elements in the training dataset in relation to another most frequent element in the training dataset;
    training a classifier to identify predicted relevant elements in the training dataset based on the features of the most frequent elements in the training dataset; and
    generating the trained model.

3. The method of claim 2, further comprising:
    generating normalization factors for the features of the most frequent elements in the training dataset; and
    normalizing the features of each of the most frequent elements in the dataset with the normalization factors generated for the training dataset.

4. The method of claim 1, wherein the respective subset of the predicted relevant elements comprise predicted relevant elements that are relevant to each other.

5. The method of claim 1, further comprising:
    adding a first predicted relevant element to a first element-chain group;
    setting a group score of the first element-chain group to an initial value;
    calculating a pair-wise score of the first predicted relevant element with each of a number of other predicted relevant elements of the group of predicted relevant elements;
    adding a second predicted relevant element having a highest pair-wise score to the first element-chain group; and
    adding the pair-wise score of the second predicted relevant element to the group score of the first element-chain group.

6. The method of claim 5, wherein the group score of the first element-chain group is computed based on a sum of pair-wise scores of predicted relevant elements in the first element-chain group.

7. The method of claim 5, further comprising:
    adding an additional predicted relevant element having a next highest pair-wise score to the first element-chain group;
    adding the pair-wise score of the additional predicted relevant element to the group score of the first element-chain group; and
    continuing to add further predicted relevant elements to the first element-chain group until a predetermined number of predicted relevant elements has been included in the first element-chain group.

8. The method of claim 1, further comprising:
    identifying a first element-chain group with a highest group score from the plurality of element-chain groups;
    identifying a second element-chain group with a next highest group score from the plurality of element-chain groups, where the second element-chain group does not include any of predicted relevant elements included in the first element-chain group; and
    continuing to identify element-chain groups with successive highest group scores until the predetermined number of element-chain groups to be outputted to the user is reached.

9. The method of claim 1, wherein the generating of the group of predicted relevant elements is based on the applying of the trained model to the features of each of the most frequent elements.

10. The method of claim 1, wherein the calculating of features of a first most frequent element of the most frequent elements comprises calculating pair-ratio values, each pair-ratio value of the pair-ratio values based on a ratio of a pair of the most frequent elements including the first most frequent element.

11. A system comprising:
    a processor; and
    a non-transitory storage medium storing instructions executable on the processor to:
    identify most frequent elements in a dataset;
    calculate features of each of the most frequent elements in the dataset;

apply a trained model to the features of each of the most frequent elements for generating a group of predicted relevant elements;

determine a plurality of element-chain groups, and calculate group scores for the plurality of element-chain groups, wherein each element-chain group of the plurality of element-chain groups includes a respective subset of predicted relevant elements that are relevant to each other;

order the plurality of element-chain groups based on the group scores for the plurality of element-chain groups, and identify a number of element-chain groups of the plurality of element-chain groups to be outputted.

12. The system of claim 11, wherein the instructions are executable on the processor to:

identify most frequent elements in a training dataset;

define features of each of the most frequent elements in the training dataset, wherein the features of each of the most frequent elements in the training dataset are defined based on a pair-ratio value of each of the most frequent elements in the training dataset in relation to another most frequent element in the training dataset;

train a classifier to identify predicted relevant elements in the training dataset based on the features of the most frequent elements in the training dataset; and generate the trained model.

13. The system of claim 12, wherein the instructions are executable on the processor to:

generate normalization factors for the features of the most frequent elements in the training dataset; and normalize the features of each of the most frequent elements in the dataset with the normalization factors generated for the training dataset.

14. The system of claim 11, wherein the instructions are executable on the processor to:

add a first predicted relevant element to a first element-chain group;

set a group score of the first element-chain group to an initial value;

calculate a pair-wise score of the first predicted relevant element with each of a number of other predicted relevant elements of the group of predicted relevant elements;

add a second predicted relevant element having a highest pair-wise score to the first element-chain group; and add the pair-wise score of the second predicted relevant element to the group score of the first element-chain group.

15. The system of claim 14, wherein the instructions are executable on the processor to:

add an additional predicted relevant element having a next highest pair-wise score to the first element-chain group;

add the pair-wise score of the additional predicted relevant element to the group score of the first element-chain group; and continue to add further predicted relevant elements to the first element-chain group until a predetermined number of predicted relevant elements has been included in the first element-chain group.

16. The system of claim 14, wherein the instructions are executable on the processor to calculate features of a first most frequent element of the most frequent elements based on calculating pair-ratio values, each pair-ratio value of the pair-ratio values comprising a ratio of a pair of the most frequent elements including the first most frequent element.

17. A non-transitory machine-readable storage medium comprising instructions that upon execution cause a system to:

identify most frequent elements in a dataset;

calculate features of each of the most frequent elements in the dataset;

apply a trained model to the features of each of the most frequent elements;

generate a group of predicted relevant elements from the most frequent elements;

determine a plurality of element-chain groups, and calculate group scores for the plurality of element-chain groups, wherein each element-chain group of the plurality of element-chain groups includes a respective subset of the predicted relevant elements that are relevant to each other;

order the plurality of element-chain groups based on the group scores for the plurality of element-chain groups; and identify a number of element-chain groups of the plurality of element-chain groups to be outputted for display.

18. The non-transitory machine-readable storage medium of claim 17, wherein the instructions upon execution cause the system to:

identify most frequent elements in a training dataset;

define features of each of the most frequent elements in the training dataset, wherein the features of each of the most frequent elements in the training dataset are defined based on a pair-ratio value of each of the most frequent elements in the training dataset in relation to another most frequent element in the training dataset;

train a classifier to identify predicted relevant elements in the training dataset based on the features of the most frequent elements in the training dataset; and generate the trained model.

19. The non-transitory machine-readable storage medium of claim 18, wherein the instructions upon execution cause the system to:

generate normalization factors for the features of the most frequent elements in the training dataset; and normalize the features of each of the most frequent elements in the dataset with the normalization factors generated for the training dataset.

20. The non-transitory machine-readable storage medium of claim 17, wherein the instructions upon execution cause the system to:

add a first predicted relevant element to a first element-chain group;

set a group score of the first element-chain group to an initial value;

calculate a pair-wise score of the first predicted relevant element with each of a number of other predicted relevant elements of the group of predicted relevant elements;

add a second predicted relevant element having a highest pair-wise score to the first element-chain group;

add the pair-wise score of the second predicted relevant element to the group score of the first element-chain group.

* * * * *